United States Patent
Yaokawa et al.

(10) Patent No.: US 8,646,745 B2
(45) Date of Patent: Feb. 11, 2014

(54) MOLD, SOLIDIFIED BODY, AND METHODS OF MANUFACTURE THEREOF

(75) Inventors: Jun Yaokawa, Nisshin (JP); Yasushi Iwata, Miyoshi (JP); Yoshio Sugiyama, Seto (JP); Hiroaki Iwahori, Aichi-ken (JP); Shuxin Dong, Owariasahi (JP); Yuichi Furukawa, Toyota (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 13/012,089

(22) Filed: Jan. 24, 2011

(65) Prior Publication Data

US 2011/0183155 A1 Jul. 28, 2011

(30) Foreign Application Priority Data

Jan. 22, 2010 (JP) .................................. 2010-012635

(51) Int. Cl.
*B29C 33/56* (2006.01)
*B28B 7/38* (2006.01)

(52) U.S. Cl.
USPC .......... 249/114.1; 249/134; 249/135; 164/47; 164/138; 164/418; 427/135; 106/38.2; 65/374.15; 977/847

(58) Field of Classification Search
USPC ............ 249/114.1–116, 134, 135; 65/374.13, 65/374.15; 164/47, 138, 418; 106/38.2; 427/133–135; 977/847
See application file for complete search history.

(56) References Cited

U.S. PATENT DOCUMENTS

| | | | | |
|---|---|---|---|---|
| 3,933,335 A * | 1/1976 | Maruyama et al. | ........ | 249/114.1 |
| 6,022,622 A * | 2/2000 | Domoto et al. | ............... | 428/408 |
| 6,080,445 A * | 6/2000 | Sugiyama et al. | .......... | 427/249.7 |
| 6,183,854 B1 * | 2/2001 | Stiller et al. | ............... | 428/312.2 |
| 6,821,624 B2 * | 11/2004 | Utsumi et al. | ............. | 204/192.1 |
| 7,947,773 B2 * | 5/2011 | Hansen et al. | ................ | 524/434 |
| 2002/0004136 A1* | 1/2002 | Gao et al. | ...................... | 428/367 |
| 2005/0008862 A1* | 1/2005 | Joseph et al. | ................. | 428/408 |
| 2005/0023727 A1* | 2/2005 | Sampson | ..................... | 264/257 |
| 2005/0196481 A1* | 9/2005 | Spradling et al. | ............. | 425/174 |
| 2006/0026996 A1* | 2/2006 | Chen | .......................... | 65/374.13 |
| 2006/0213227 A1* | 9/2006 | Leu | ........................... | 65/374.15 |
| 2008/0087793 A1* | 4/2008 | Shepheard | ..................... | 249/80 |
| 2009/0186214 A1* | 7/2009 | Lafdi et al. | ................... | 428/336 |
| 2009/0218681 A1* | 9/2009 | Chrysler et al. | ............. | 257/713 |
| 2010/0062099 A1* | 3/2010 | Funke et al. | ................. | 425/446 |

(Continued)

FOREIGN PATENT DOCUMENTS

CN 101444826 A 6/2009
JP 58141832 A * 8/1983 ............. B22D 11/04

(Continued)

OTHER PUBLICATIONS

Translation of JP 2008-105082. (date is not applicable).*

(Continued)

*Primary Examiner* — Dimple Bodawala
(74) *Attorney, Agent, or Firm* — Sughrue Mion, PLLC

(57) ABSTRACT

A mold includes: a base; and a contact surface which is provided on the base and which comes into contact with a molten material. The contact surface is provided with a first surface portion that includes a first fiber layer in which first carbon fibers are raised, and a second surface portion having different surface characteristics from the first surface portion.

6 Claims, 13 Drawing Sheets

(56) References Cited

U.S. PATENT DOCUMENTS

| | | | |
|---|---|---|---|
| 2010/0136292 A1* | 6/2010 | Lucas et al. | 428/156 |
| 2010/0227058 A1* | 9/2010 | Zhang et al. | 427/249.1 |
| 2010/0323207 A1* | 12/2010 | Pinault et al. | 428/446 |
| 2011/0127403 A1* | 6/2011 | Furukawa et al. | 249/114.1 |
| 2011/0133053 A1* | 6/2011 | Furukawa et al. | 249/115 |
| 2011/0223339 A1* | 9/2011 | Furukawa et al. | 427/402 |

FOREIGN PATENT DOCUMENTS

| | | | | |
|---|---|---|---|---|
| JP | 60063335 A * | 4/1985 | | C22C 1/02 |
| JP | 08318362 A | 12/1996 | | |
| JP | 2001-316800 A | 11/2001 | | |
| JP | 2002-035917 A | 2/2002 | | |
| JP | 2002-363705 A | 12/2002 | | |
| JP | 2003-088939 A | 3/2003 | | |
| JP | 2004-026532 A | 1/2004 | | |
| JP | 2005-076756 A | 3/2005 | | |
| JP | 2006-044265 A | 2/2006 | | |
| JP | 2007-534508 A | 11/2007 | | |
| JP | 2008-105082 A | 5/2008 | | |
| JP | 2009-022957 A | 2/2009 | | |
| JP | 2009-158152 A | 7/2009 | | |
| JP | 2009149474 A * | 7/2009 | | C03B 11/00 |
| JP | 2010036194 A * | 2/2010 | | B22C 3/00 |
| JP | 2010137246 A * | 6/2010 | | B22D 17/20 |
| WO | WO 2005/102922 A1 | 11/2005 | | |
| WO | WO 2010013770 A1 * | 2/2010 | | B22C 9/06 |

OTHER PUBLICATIONS

Translation of JP 2007-144499 (date is not applicable).*
Japanese Office Action issued on Dec. 27, 2011 in copending Japanese Application No. 2010-012635.
Office Action issued in copending Japanese application No. JP2010-012635 dated Apr. 13, 2012.

* cited by examiner

TEST PIECE No. 1-1
(SKD61: NO UNDERLAYER)

CARBON DIAMETER, ≤0.1 μm; MAXIMUM
SPATIAL DIMENSION: WIDTH, ≤1 μm

FIG. 4B
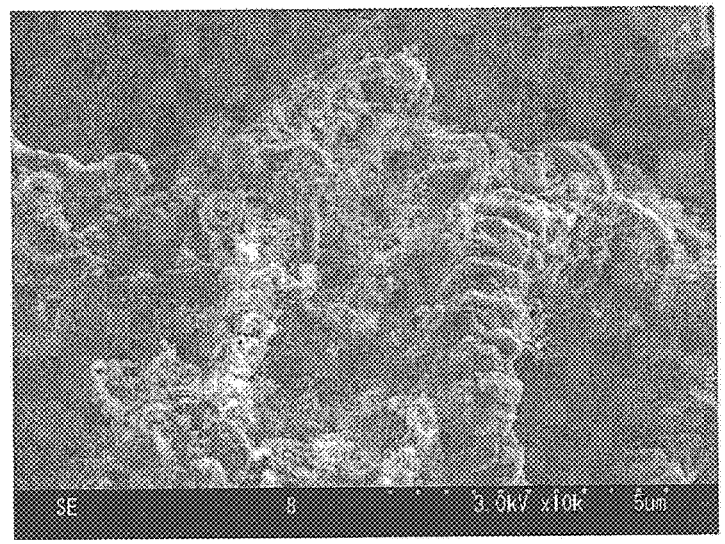
SURFACE
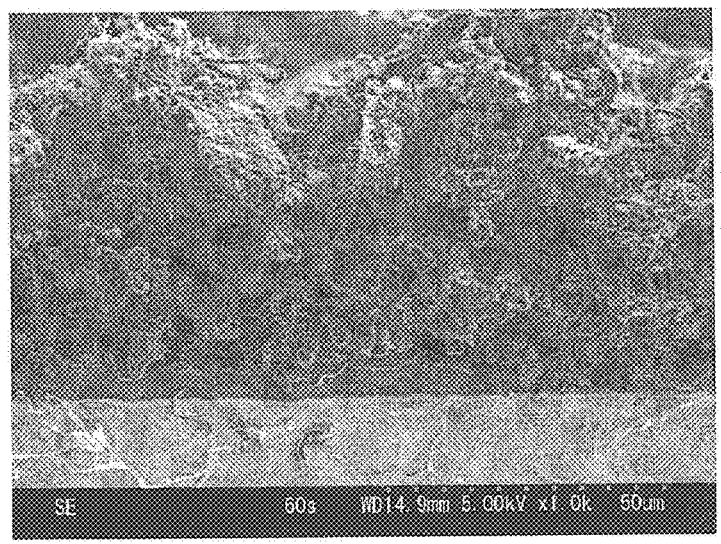
CROSS-SECTION
TEST PIECE No. 1-2
(SKD61 + Ni PLATING LAYER, 0.4 $\mu$m)
CARBON DIAMETER, 0.1 TO 0.2 $\mu$m; MAXIMUM
SPATIAL DIMENSION: WIDTH, ≥10 $\mu$m TEST PIECE No. 1-3
(SKD61 + Ni PLATING LAYER, 2.9 μm)

CARBON DIAMETER, 0.1 TO 0.2 μm; MAXIMUM
SPATIAL DIMENSION: WIDTH, <10 μm

FIG. 5A
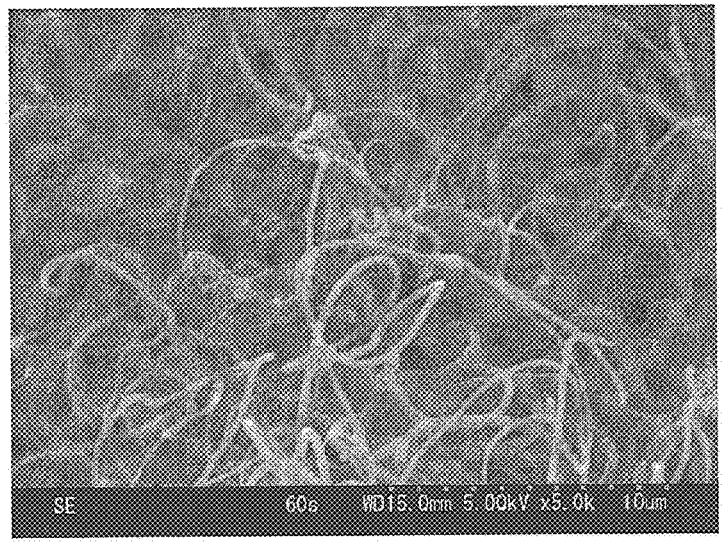
SURFACE
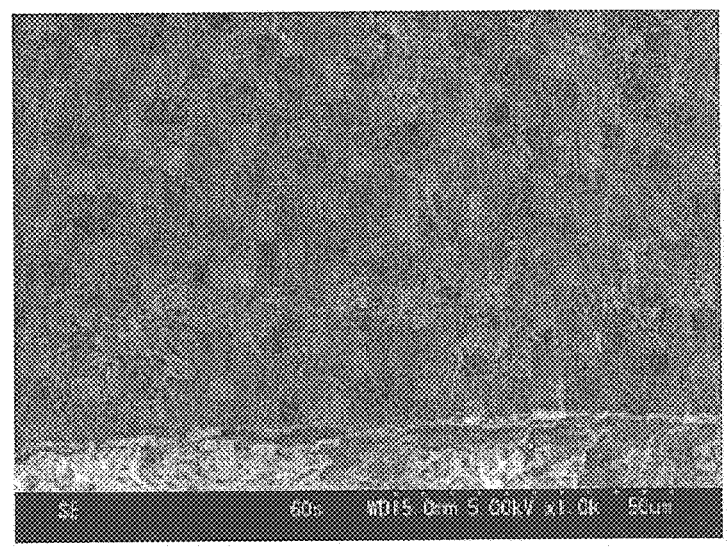
CROSS-SECTION
TEST PIECE No. 2-4
(Cu − 62% W + Ni PLATING LAYER, 0.56 μm)
CARBON DIAMETER, 0.1 TO 0.5 μm; MAXIMUM
SPATIAL DIMENSION: WIDTH, ≥10 μm

FIG. 5B
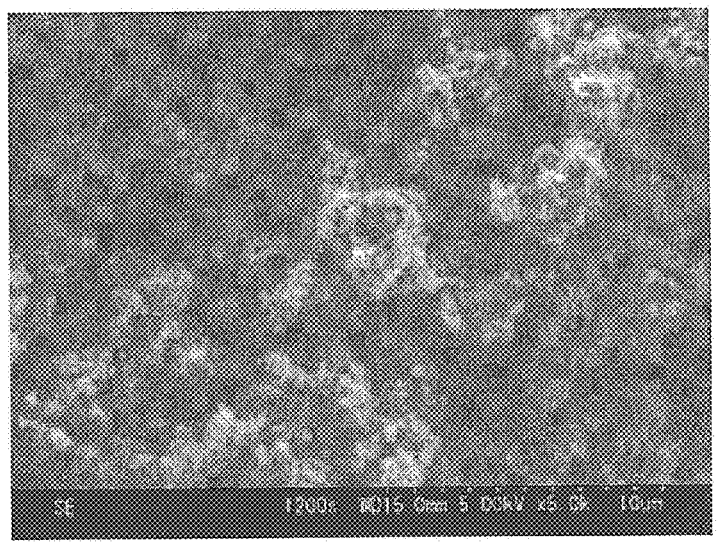
SURFACE
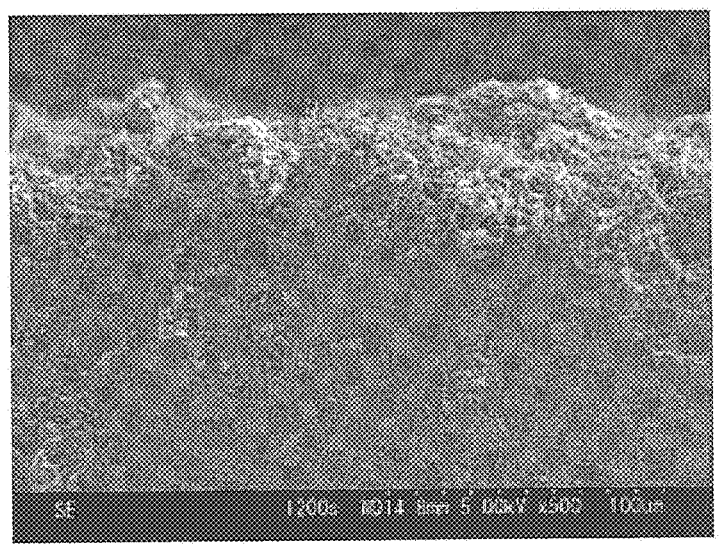
CROSS-SECTION
TEST PIECE No. 2-6
(Cu - 62% W + Ni PLATING LAYER, 7.3 μm)
CARBON DIAMETER, 0.1 TO 0.2 μm; MAXIMUM
SPATIAL DIMENSION: WIDTH, <10 μm TEST PIECE No. 2-1
(Cu - 62% W: NO UNDERLAYER)

TEST PIECE No. 2-2
(Cu - 62% W + Ni PLATING LAYER, 0.37 μm)

TEST PIECE No. 2-5
(Cu - 62% W + Ni PLATING LAYER, 1.83 μm)

TEST PIECE No. 3-1
(Cu – 2.1% Ni: NO UNDERLAYER)

TEST PIECE No. 3-2
(Cu – 6.6% Ni, NO UNDERLAYER)

TEST PIECE No. 4-1
(Cu – 1.4% Fe: NO UNDERLAYER)

TEST PIECE No. 4-2
(Cu – 6.4% Fe, NO UNDERLAYER)

BEFORE CASTING

COMPARATIVE
EXAMPLE

EXAMPLE

AFTER SIX SHOTS
OF CASTING

COMPARATIVE
EXAMPLE

EXAMPLE

F I G. 10
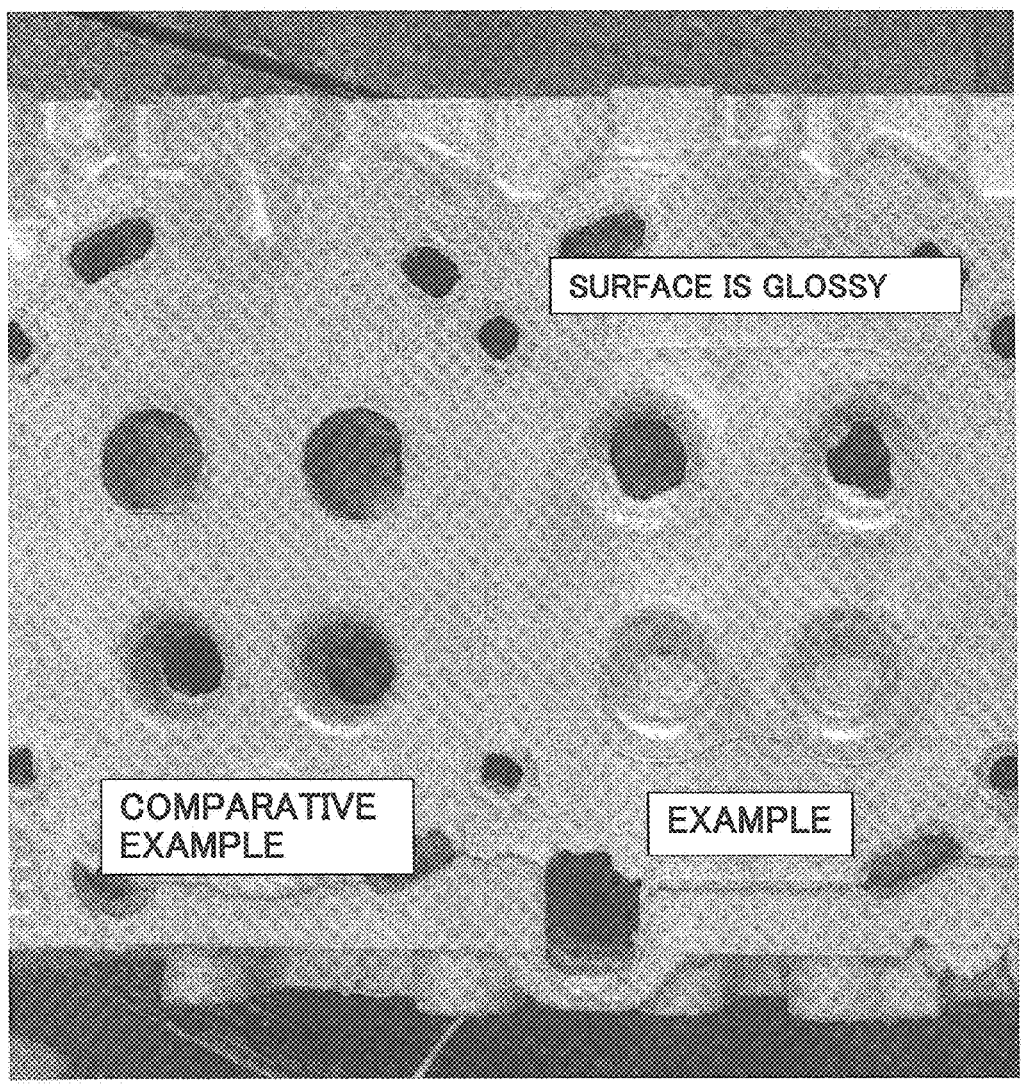

MOLD, SOLIDIFIED BODY, AND METHODS OF MANUFACTURE THEREOF

INCORPORATION BY REFERENCE

The disclosure of Japanese Patent Application No. 2010-012635 filed on Jan. 22, 2010 including the specification, drawings and abstract is incorporated herein by reference in its entirety.

BACKGROUND OF THE INVENTION

1. Field of the Invention

The invention relates to a mold for use in the manufacture of solidified bodies (e.g., castings, molded plastic parts) obtained by cooling and solidifying a molten material such as a metal melt or a resin, and to a method of manufacturing such a mold. The invention further relates to a solidified body thus obtained and to a method of manufacturing such a solidified body.

2. Description of the Related Art

When a process such as mold casting, die casting, or the injection molding of plastic is carried out, a mold in accordance with the shape of the desired casting or molded plastic part is used. Because molds are generally expensive, there exists a desire to extend the life of the mold by enhancing, for example, the mold release properties and wear resistance. The interior surfaces (the surfaces which come into contact with the molten material) of a mold are thus often subjected to various types of surface treatment such as those described in Japanese Patent Application Publication No. 2001-316800 (JP-A-2001-316800), Japanese Patent Application Publication No. 2002-363705 (JP-A-2002-363705), Japanese Patent Application Publication No. 2002-35917 (JP-A-2002-35917) and Japanese Patent Application Publication No. 2008-105082 (JP-A-2008-105082).

However, such conventional surface treatment does not take into account such concerns as improving the flow properties and filling properties of the molten material within the mold, shortening the task time (cycle time), and achieving a solidification structure that is finer. Japanese Patent Application Publication No. 8-318362 (JP-A-8-318362) teaches that by constructing a die casting mold of a plurality of bases having different thermal conductivities, the rate of solidification by the melt will vary from place to place within the mold, enabling directional solidification to be carried out. However, this is not due to surface treatment.

SUMMARY OF THE INVENTION

The invention provides a mold which achieves through surface treatment such effects as improved flow properties and filling properties by the molten material within the mold, shortening of the task time, and improvement in the solidification structure of the resulting solidified body. Furthermore, the invention provides a method of manufacturing such a mold, a solidified body obtained using such a mold, and a method of manufacturing such a solidified body.

As a result of extensive research and repeated trial-and-error investigations, the inventors have discovered that, by varying the raised state of carbon fibers according to the region of the contact surface of the mold which comes into contact with the molten material, the thermal conductivity of the molten material inside the mold can be controlled. By building on this result, they ultimately arrived at the various aspects of the invention described below.

The Mold

In a first aspect, the invention relates to a mold. The mold includes: a base; and a contact surface which is provided on the base and which comes into contact with a molten material. The contact surface includes a first surface portion having a first fiber layer in which first carbon fibers are raised and a second surface portion having different surface characteristics from the first surface portion.

In the mold according to the first aspect of the invention, the surface characteristics have been changed according to the region of the contact surface of the mold which comes into contact with the molten material. This enables the heat transfer properties (heat transference) from the molten material to the mold to be changed according to the region of the mold contact surface without going to the extent of changing the material making up the mold base. It is possible to control, for example, the temperature of the molten material during filling (or charging) into the mold cavity, and the cooling rate of the molten material after filling is complete. In this way, by means of surface treatment applied to the inside surfaces (shaping surfaces) of the mold, it is possible to, for example, improve the flow properties of molten material in the mold, improve the mold filling properties of the molten material, shorten the task time from filling of the molten material until the end of solidification, and also improve the solidification structure of the solidified body obtained by solidification of the molten material.

Moreover, the heat transfer properties (heat transference from the molten material to the mold) at the surface portion where a fiber layer is present are not necessarily fixed, and may vary even at some intermediate point from the start of molten material filling up until the end of solidification. For example, by adjusting the raised state of the carbons fibers, a fiber layer which is highly resilient and capable of shrinking under the pressure incurred from the molten material (fluid pressure such as filling pressure) may be formed. This fiber layer is generally in a sparse state containing numerous voids between the carbon fibers, and acts as a heat-insulating layer. Heat transfer between the molten material at the start of filling and the mold is thus blocked by this fiber layer, holding down the decrease in the temperature of the molten material. However, as the fluid pressure by the molten material rises due to the applied pressure at about the end of filling, the fiber layer in contact with the molten material becomes compressed and there are fewer voids between the carbon fibers, resulting in a dense state. As a result, the thermal conductivity of the fiber layer itself rises, heat transference from the molten material to the mold improves, and the temperature of the molten material rapidly drops. By providing a fiber layer according to the first aspect of the invention on a contact surface of a mold, the temperature and rate of solidification during filling of the molten material into the mold can be controlled in a planar or spatial manner according to the region within the mold. In addition, by adjusting the form of the fiber layer, the temperature and rate of solidification (cooling rate) of the molten material can be controlled over time as well, even during the steps from the start of molten material filling until the end of solidification.

In the mold according to the first aspect of the invention, the second surface portion may be the untreated surface of the mold base itself, or may be the treated surface of the mold base. Moreover, the second surface may have a second fiber layer in which second carbon fibers are raised in a state which differs from that of the first fiber layer in terms of, for example, average fiber diameter, average fiber length and raised fiber density. In the first aspect of the invention, "first" and "second" are used as convenient terms for clearly explaining the substance of the first aspect of the invention.

The two types of surface portions mentioned in the first aspect of the invention, these being the first surface portion and the second surface portion, are merely presented here by way of illustration as the minimum number of types of surface portions. The inner surfaces of the mold (contact surface) can be thought of as a combination of various surface portions of differing heat transfer properties; the number of types of such surface portions is not limited merely to two, and may be three or more. Specifically, the contact surface of the mold may be configured by variously combining the following in accordance with such considerations as the shape of the mold cavity (shape of the solidified body) and the method of filling the molten material into the mold: a plurality of types of fiber layers, a plurality of types of untreated base surfaces, and a plurality of types of surface treatment layers other than the fiber layer. It is possible in this way to produce a high quality solidified body highly efficiently.

The first aspect of the invention is well-suited for die casting in which a metal melt which is the molten material is filled under pressure into a cavity. That is, the mold according to the first aspect may be a die casting mold into the cavity of which a metal melt is filled under pressure. This is because, in die casting, the temperature of the metal melt and control of the cooling rate strongly affect product quality and productivity. All or part of the die casting mold may be made of a metal having a high thermal conductivity (e.g., copper or a copper alloy). It is possible in this way to give the casting obtained, either at specific sites thereon or throughout the entire casting, a metal crystalline structure that is both dense and fine. Because the fiber layer according to the first aspect of the invention is formed at a mold contact surface having such a high thermal conductivity, this has the desirable effect of making it possible to achieve good metal melt flow properties and good mold filling properties, and also to achieve rapid cooling and solidification of the metal melt.

Method of Manufacturing the Mold

The invention also relates to a method of manufacturing a mold described above. That is, a second aspect of the invention relates to a method of manufacturing the above-described mold. This method of manufacture includes: an underlayer forming step of forming on the base an underlayer which contains one or more specific elements selected from the group consisting of nickel, iron and cobalt, and accords with a region of the contact surface; and a fiber layer forming step of forming on the underlayer a fiber layer of raised carbon fibers of one or more selected from the group consisting of carbon nanofibers, carbon nanocoils and carbon nanotubes.

Solidified Body and Method of Manufacture Thereof

In addition, the invention also relates to a method of manufacturing a solidified body using a mold such as the above-described mold, and to a solidified body obtained in this way. Thus, a third aspect of the invention relates to a method of manufacturing a solidified body. This method includes: a filling step of filling a molten material into the above-described mold; and a solidifying step of cooling and solidifying the molten material after the filling step through the mold. The solidified body in which the molten material has solidified into a desired shape is obtained in the solidifying step. A fourth aspect of the invention relates to a solidified body. This solidified body is obtained by the foregoing manufacturing method and a porosity of the solidified body is equal to or less than 0.18%.

Other

Unless noted otherwise, a range denoted by "x to y" in this specification includes the lower limit x and the upper limit y. Also, new ranges such as "a to b" may be defined by the arbitrary combination of lower and upper limits mentioned in this specification. Any numerical value included within a range mentioned in the specification may be used as an upper or lower limit for defining a numerical range.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 4B presents scanning electron micrographs showing the surface of test piece No. 1-2 (SKD61+0.4 μm Ni plating layer) following surface treatment and a cross-section of the surface layer;

FIG. 5A presents scanning electron micrographs showing the surface of test piece No. 2-4 (Cu–62% W+0.56 μm Ni plating layer) following surface treatment and a cross-section of the surface layer;

FIG. 5B presents scanning electron micrographs showing the surface of test piece No. 2-6 (Cu–62% W+7.3 μm Ni plating layer) following surface treatment and a cross-section of the surface layer;

FIG. 10 is a diagram showing a surface of the solidified body of the example and the solidified body of the comparative example that are cast using the mold of the example of the invention and the mold of the comparative example, respectively.

DETAILED DESCRIPTION OF EMBODIMENTS

Figure 1:
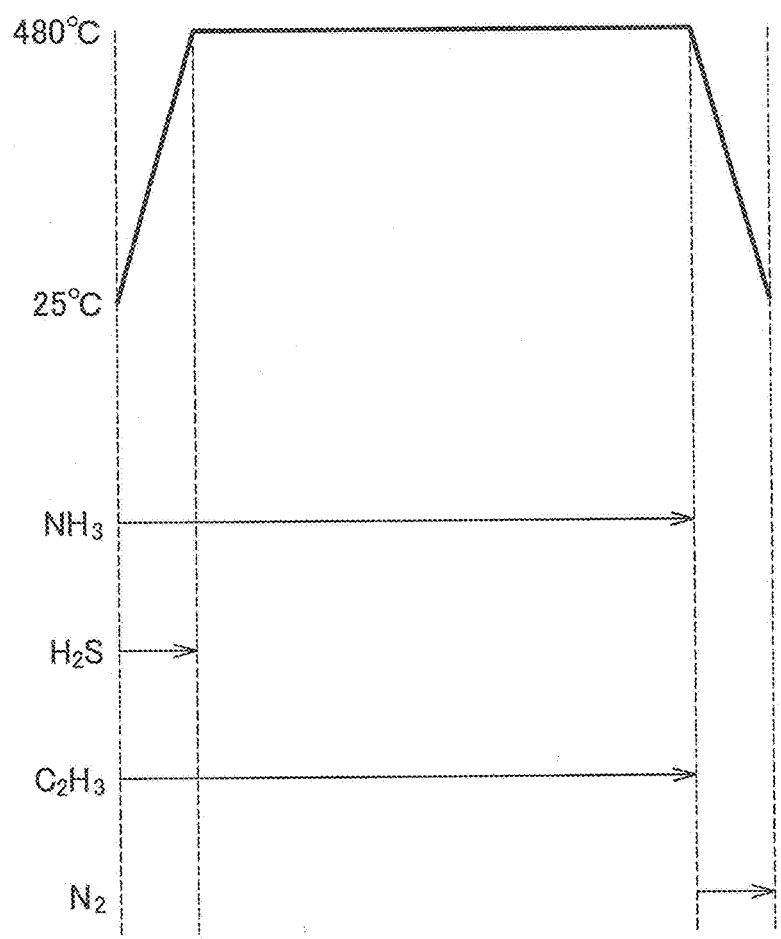
FIG. 1 shows the pattern of heat treatment applied to a test piece.

The invention is described below in greater detail by reference to the embodiments of the invention. Any one or more arrangements selected from among the contents of this specification, inclusive of the embodiments appearing below, may be added to the above-described arrangements of the invention, regardless of category. For example, an arrangement relating to a method of manufacture may, when understood as a product-by-process, become an arrangement relating to a product. Whether or not a certain one of the embodiments is the best embodiment will vary depending on the subject, required performance, etc.

The Mold (1) The Base

The material making up the base of the mold of the invention is of no particular concern. It is generally common for alloyed steels having excellent properties such as wear resistance (e.g., materials having the SKD designation in the Japanese Industrial Standards (JIS)) to be used. Of course, all or part of the mold may be made of a material having a higher thermal conductivity (e.g., copper, copper alloy, aluminum alloy). It is possible in this way to increase the cooling rate of the molten material, either partially or throughout, and thus obtain a solidified body having a dense structure, or to shorten the end of solidification time (task time).

Of course, depending on the material making up the base, there will be cases in which raising carbon fibers directly on the surface will be difficult. For example, when a metal having no raised carbon fibers thereon, such as high-thermal-conductivity pure copper or copper alloy (e.g., Cu—W alloy), is employed in the base, there will be cases in which carbon fibers cannot be raised directly thereon, although this will vary also with the ingredient composition. Even with a copper alloy, when the alloy includes specific elements having catalytic effects, such as nickel or iron, the raised state (the free-standing state) of the carbon fibers may vary depending on the content of these elements. According to research conducted by the inventor, when a Ni—Cu alloy contains at least 2.1 wt % of nickel or a Fe—Cu alloy contains at least 1.4 wt % of iron, carbon fibers covering 100% of the base surface can be raised thereon. On the other hand, when the nickel or iron content is too low, coverage of the base surface by carbon fibers will decrease according to that content.

Of course, regardless of the particular base material used, it is possible to raise carbon fibers which cover 100% of the base surface by providing the subsequently described underlayer on the base. Accordingly, in the invention, the base material may be freely selected without regard to the raising of carbon fibers.

(2) Fiber Layer and Carbon Fibers

In the invention, "fiber layer" refers to a layer formed by the raising of carbon fibers at a mold contact surface which comes into contact with the molten material. The carbon fibers may be raised directly from the base itself as described above, or may be raised from an underlayer formed on the base.

The type of carbon fiber, the raised state of the carbon fibers and the method of production are of no particular concern. Of course, it is preferable for the carbon fibers to be of one or more types selected from among carbon nanofibers, carbon nanocoils and carbon nanotubes. The fiber layer composed of such carbon fibers (where appropriate, referred to below as "carbon nanofibers") has a high degree of freedom of form. For this reason, the fiber layer composed of carbon nanofibers also has a high degree of freedom of control with respect to the temperature and cooling rate of the molten material. In addition, carbon nanofibers, on account of an anchoring effect, are difficult to dislodge from the mold surface, and the fiber layer composed of these carbon nanofibers has a good ability to follow volumetric changes in the mold. Hence, the fiber layer does not readily give rise to peeling or cracking, making it easy to extend the life of the mold.

The diameter, length, shape (e.g., straight, spiral, twisted), raised fiber density and other properties of the carbon fibers making up the fiber layer are also not particularly limited. It is preferable to use a suitable form in accordance with the desired heat transfer properties between the molten material and the mold.

Specifically, the carbon fibers making up the fiber layer may have an average fiber diameter of preferably from 0.1 to 0.5 µm, and more preferably from 0.2 to 0.4 µm, and a maximum spatial dimension (maximum distance between fibers) of preferably at least 10 µm, and more preferably at least 15 µm. Because large voids are present within a fiber layer composed of such carbon fibers, the fiber layer has good heat insulating properties (low thermal conductivity) and a high resilience. In the specification, such a fiber layer is referred to, where appropriate, as a "sparse fiber layer." The thickness of the sparse fiber layer, as measured from the foundation for the raised carbon fibers (the free-standing carbon fibers), is from 30 to 800 µm.

This sparse fiber layer suppresses a decline in the temperature of the molten material during filling, and enables the flow properties and mold filling properties of the molten material to be increased. Conversely, when the pressure of the molten material increases at about the end of filling, the fiber layer in contact with the molten material is compressed and becomes thinner. This makes the voids in the fiber layer smaller, changing the fiber layer into a dense layer. As a result, the thermal conductivity of the fiber layer itself increases, leading in turn to a rise in heat transference between the molten material and the base. Therefore, when a sparse fiber layer is provided on the inside surfaces of the mold, it is possible to maintain the temperature of the molten material during filling at a relatively high temperature while allowing rapid cooling and solidification of the molten material to occur after the end of filling. Accordingly, it is possible both to ensure the flow properties and the mold filling properties of the molten material and also to shorten the rapid cooling and solidification and the end of solidification time for the molten material.

Alternatively, the carbon fibers making up the fiber layer may have an average fiber diameter of 0.1 µm or less, or even 0.05 µm or less, and may have a distance between fibers (maximum spatial dimension) of 10 µm or less, or even 5 µm or less. A fiber layer composed of such carbon fibers has small voids within the layer and is thus in a dense state. In the specification, such a fiber layer is typically referred to as a "dense fiber layer." Incidentally, the thickness of a dense fiber layer, as measured from the foundation for the raised carbon fibers, is from 30 to 1,000 µm.

The heat transfer properties when such a dense fiber layer is provided are intermediate between those of the base itself and those when a sparse fiber layer is provided. By providing a dense fiber layer, it is possible to adjust, for example, the drop in temperature by the molten material during filling, and the molten material solidification rate after the end of filling. The fiber layer provided in the first surface portion according to the invention may be either a sparse fiber layer or a dense fiber layer. For example, if a sparse fiber layer is provided on the first surface portion, the second surface portion according to the invention may be formed of a dense fiber layer or may be the mold base surface left as is. Even when the first surface portion and the second surface portion are both either a sparse fiber layer or a dense fiber layer, the raised state (surface characteristics) such as the fiber diameter, maximum spatial dimension or the raised fiber density of the carbon fibers may be varied at the respective surface portions. In this way, there can be obtained a mold capable of finely regulating or controlling the temperature of the molten material.

(3) Underlayer

The underlayer serves as a foundation for the raised carbon fibers. By providing such an underlayer, as noted above, a fiber layer can be provided in various molds without particular concern for the material making up the base. It is preferable for such an underlayer to include a specific element having a catalytic effect which promotes the formation or growth of graphite or carbon nanofibers. Specifically, it is preferable for the underlayer to include one or more types of specific elements from among nickel (Ni), iron (Fe) and cobalt (Co). More specifically, the underlayer is a plating layer which includes, for example, this specific element.

However, according to research by the inventor, it has been found that the raised state of the carbon fibers and the form of the fiber layer can be controlled by means of, for example, the type and thickness of the underlayer. For example, when the underlayer is a nickel plating layer, at an underlayer thickness which is less than 1.5 µm, 1 µm or less, or even 0.5 µm or less, a sparse fiber layer is easily obtained. On the other hand, at a nickel plating layer thickness of 1.5 µm or more, or even 2 µm or more, a dense fiber layer is easily obtained. Moreover, to raise the carbon fibers in a stable manner, it is advantageous for the thickness of the nickel plating layer to be set to preferably at least 0.1 µm, more preferably at least 0.2 µm, and even more preferably at least 0.3 µm.

Method of Manufacturing Mold (1) Fiber Layer-Forming Step

The inventive method of manufacturing a mold requires at least a fiber layer-forming step in which a fiber layer of raised carbon fibers is formed. Specifically, the surface of the mold base (including the surface of the underlayer) is exposed to, for example, a warmed, chain-type unsaturated hydrocarbon gas (where appropriate, referred to below as "carbon source gas") such as acetylene gas ($C_2H_2$). This carbon source gas decomposes into carbon and hydrogen on the base surface (or the underlayer surface), whereupon, with the metal (e.g., iron, nickel, cobalt) present at the base surface functioning as a catalyst, carbon fibers such as carbon nanocoils, carbon nanotubes or carbon nanofibers (filaments) grow in a raised state on the base surface (or the underlayer surface), forming a fiber layer according to the invention.

The carbon source gas is preferably fed as a mixed gas containing one or more types of gases such as ammonia gas ($NH_3$), hydrogen sulfide gas ($H_2S$) and carbon disulfide gas ($CS_2$). The use of a mixed gas promotes the raising and growth of carbon fibers, suppresses sooting (the phenomenon in which soot produced by aggregating carbon particles liberated from the carbon source gas is deposited on the base surface), and enables uniformity of the fiber layer to be achieved. The dilution ratio or mixing ratio of these gases is suitably selected according to the desired thickness and form of the fiber layer.

The temperature of the carbon source gas (inclusive of the above-described mixed gases) is preferably set to from 300 to 700° C., and more preferably from 410 to 510° C. If this temperature is too low, the raising of carbon fibers will not proceed, whereas if the temperature is too high, the base of the mold may deteriorate or otherwise be adversely affected by carburization of a steel material or by oxidation. The fiber layer-forming step is carried out, for example, in an atmosphere furnace within which the mold base has been placed. Before feeding the carbon source gas into this furnace, the interior of the furnace may be purged with a non-oxidizing gas such as nitrogen, hydrogen or argon. Also, the gas pressure, although basically of no concern, from the standpoint of preventing the outer air from flowing into the furnace and promoting the raising and growth of carbon fibers, is preferably set to a pressure that is higher than atmospheric pressure.

(2) Underlayer-Forming Step

The raising of carbon fibers or the formation of a fiber layer does not necessary require that an underlayer be formed on the base surface. Of course, by providing an underlayer, it is possible to control the form of the fiber layer (e.g., the diameter and maximum spatial dimension of the fibers and the density and thickness of the fiber layer). Also, by providing an underlayer, it is possible to raise carbon fibers which differ from carbon fibers that are raised directly on the base surface. Also, by providing an underlayer, it is possible to form the desired fiber layer even in cases where the base (at least the vicinity of the base surface) is formed of a metal having no raised carbon fibers thereon. In addition, by providing an underlayer, the raising and growth of carbon fibers can be promoted, enabling the fiber layer to be formed at a high efficiency.

It is thus desirable to provide an underlayer-forming step which forms an underlayer on the base in accordance with the region of the contact surface. The underlayer is a crystalline layer or a non-crystalline layer which contains a specific element and in which the carbon fibers are raised. The specific element is one or more types from among nickel, iron and cobalt. The underlayer may be, for example, a plating layer. The plating layer can easily be formed by, for example, Ni—P plating or Fe—P plating. This plating may be electrolytic plating or electroless plating. The material making up the base is of no particular concern.

However, according to research by the inventor, it has been found that the form of the fiber layer (e.g., the properties of the carbon fibers, and the density and thickness of the fiber layer) can be controlled by the thickness of the plating layer. Hence, when plating layers of differing thicknesses are pre-formed in accordance with the region of the contact surface, a plurality of types of fiber layers of differing surface properties can easily be formed even in a single fiber layer-forming step. This also facilitates the formation of a first surface portion and a second surface portion according to the invention. Accordingly, the underlayer-forming step is preferably a plating step which forms a plating layer of a thickness that differs according to the region of the contact surface. Incidentally, the presence or absence of a plating layer and the thickness of the plating layer can easily be changed and adjusted by masking which accords with the region of the base surface.

The underlayer is not limited to metal layers such as a nickel plating layer, and may be a non-metallic layer composed of nonmetallic elements having a carbon fiber-forming (especially, a carbon nanofiber-forming) catalytic function.

For example, the underlayer may be a nitrided layer or a carburized layer, or may be a mixed layer of these with a metal layer.

Uses

The mold of the invention may be a casting mold or may be a mold for use in molding plastics. The inventive mold may be an entire mold or may be a mold element making up part of an entire mold, and may also include a core, insert or the like. The mold of the invention is particularly well-suited for use as a mold for die-casting light metals such as magnesium alloys or aluminum alloys, the reason being that when die casting is carried out, temperature changes in the metal melt that has been filled into the mold have a large influence on the quality of the casting and the casting efficiency.

EXAMPLES

The invention is illustrated more fully below by way of examples.

Fabrication of Test Pieces (1) Base

Plate-like test pieces measuring 1 cm×5 cm×5 cm was cut from alloy rods of the respective ingredient compositions shown in Table 1.

(2) Underlayer-Forming Step

The surface (polished face) of each of the test piece shown in Table 1 was subjected to Ni—P plating. The Ni—P plating operation was carried out as follows.

First, the test piece was electrochemically polished and subsequently thoroughly rinsed with water, thereby removing the oxide film and activating the surface of the test piece (pre-treatment step). This polished face was subjected to electroless Ni—P plating. In this way, a Ni—P plating layer (Ni plating layer) was formed as an underlayer on the surface of the test piece (underlayer-forming step, plating step).

However, in cases where the test piece is made of a copper alloy (e.g., Cu—W alloy), electroless plating often will not start spontaneously. Therefore, during the first 10 seconds that the test piece was immersed in an electroless Ni—P plating solution, electrolytic plating was carried out by applying a voltage of about −1.0 V to the test piece (induced plating step). In this way, a little Ni—P alloy was made to precipitate onto the surface of the test piece. The electrode was then removed, and primary electroless plating was carried out for 10 to 600 seconds. Ultimately, through electrolytic plating and electroless plating, a solid Ni—P plating layer (underlayer) having a total thickness of from 0.37 to 2.5 µm was formed on the surface of the test piece.

(3) Fiber Layer-Forming Step

The following type of surface treatment was carried out on each of the test pieces shown in Table 1 using an atmosphere furnace (fiber layer-forming step). A test piece on which Ni—P plating had not been carried out was subjected to direct surface treatment on a polished face that had been polished with #400 (JIS R6001) water-resistant polishing paper. Meanwhile, the Ni—P plated surface of each of the test pieces was subjected to the following surface treatment. That is, each test piece was placed in a pit-type atmosphere furnace (specifically, a retort), and the interior of the furnace was purged with a vacuum pump. Nitrogen gas was then fed into the furnace, thereby rendering the atmosphere within the furnace non-oxidizing. Various types of gas containing a carbon source gas were fed into the furnace based on the heat treatment pattern shown in FIG. 1. The gases fed at this time were ammonia gas ($NH_3$), hydrogen sulfide gas ($H_2S$) and acetylene gas ($C_2H_2$), and also nitrogen gas ($N_2$), which is used only for cooling after treatment. The feed rates of the respective gases were as follows: $NH_3$, 15 NL/min; $C_2H_2$, 0.6 NL/min; $H_2S$, 0.4 NL/min; $N_2$, 15 NL/min (only when cooling). The treatment temperature was 480° C., and the treatment time was 3 hours. The temperature within the furnace was raised over a period of 0.5 hour from room temperature (25° C.) at the start to 480° C. Following the end of treatment, the temperature within the furnace was lowered to room temperature (25° C.) over a period of about 0.5 hour while a stream of $N_2$ gas was passed through the furnace.

Surface Examination and Measurement

The surface of each test piece following the above-described surface treatment was examined with a scanning electron microscope. The micrographs are shown in FIGS. 4 to 8. Using these micrographs, the size (diameter) of the carbon fibers raised on each test piece and the maximum spatial dimension, which is the maximum distance between carbon fibers, were specified. The methods for specifying these numerical values, which are used in common throughout this specification, involve measuring the fiber diameters of the ten carbon fibers having the largest diameters and measuring the maximum spatial dimensions at the ten places where the distance between carbon fibers is the greatest in each visual field (for three or more visual fields), and determining the averages for each.

Figure 4A:
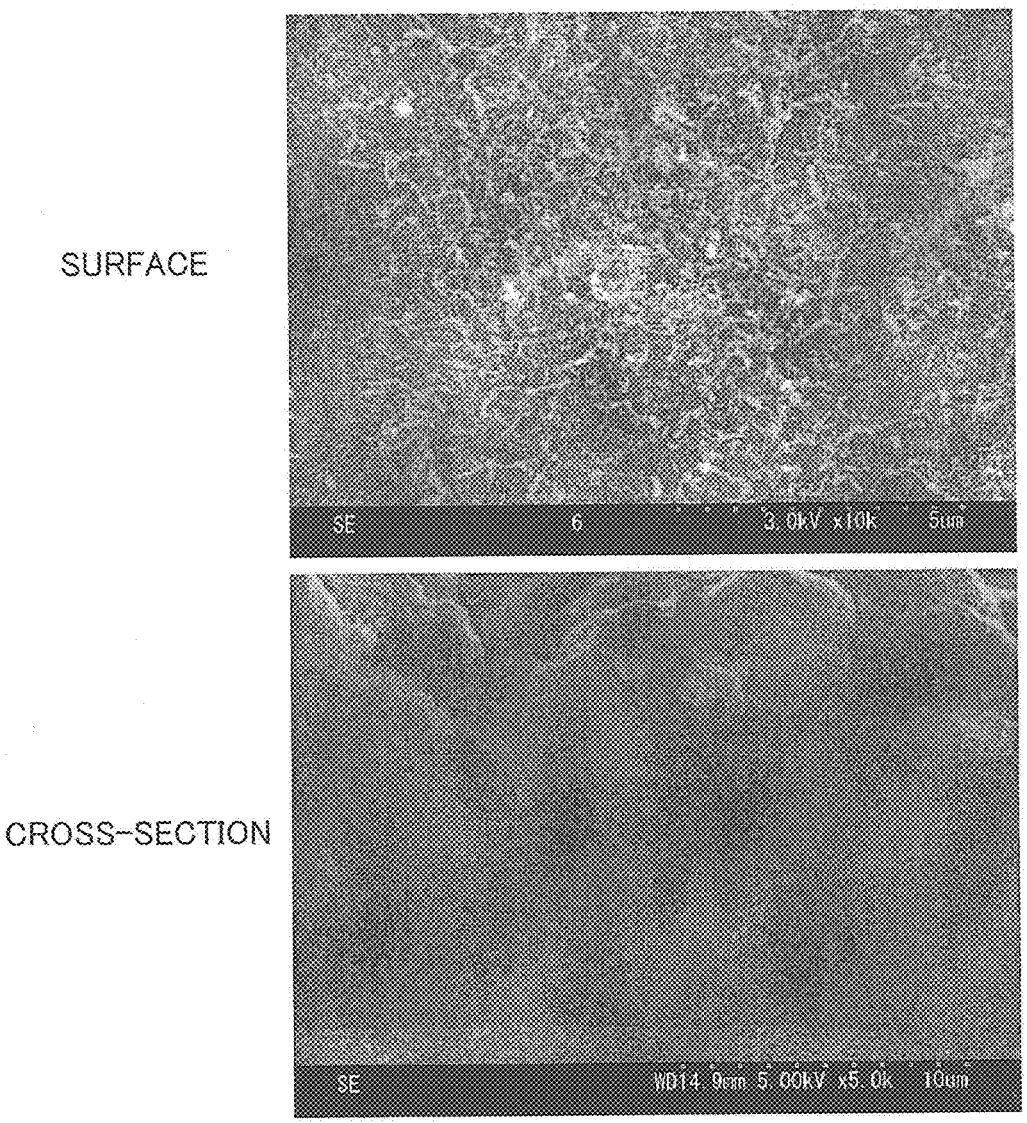
FIG. 4A presents scanning electron micrographs showing the surface of test piece No. 1-1 (SKD61) following surface treatment and a cross-section of the surface layer.
Figure 4C:
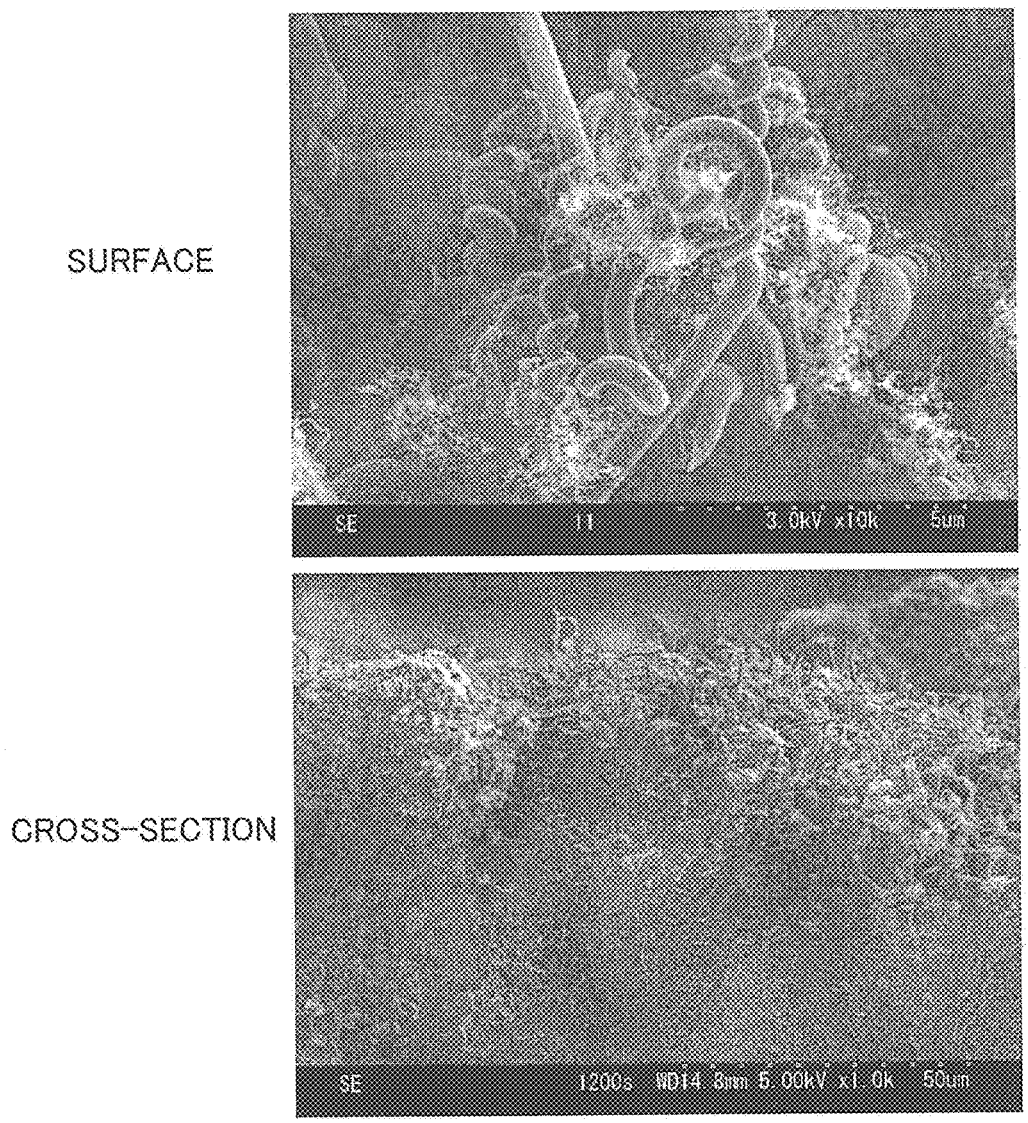
FIG. 4C presents scanning electron micrographs showing the surface of test piece No. 1-3 (SKD61+2.9 μm Ni plating layer) following surface treatment and a cross-section of the surface layer.
Figure 6A:
FIG. 6A is a scanning electron micrograph showing the surface of a test piece following surface treatment, this being the surface of test piece No. 2-1 (Cu–62% W)
Figure 6B:
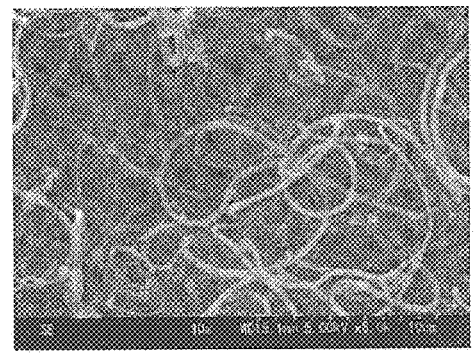
FIG. 6B is a scanning electron micrograph showing the surface of a test piece following surface treatment, this being the surface of test piece No. 2-2 (Cu–62% W+0.37 μm Ni plating layer)
Figure 6C:
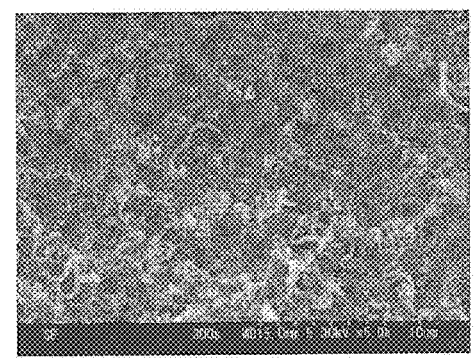
FIG. 6C is a scanning electron micrograph showing the surface of a test piece following surface treatment, this being the surface of test piece No. 2-5 (Cu–62% W+1.83 μm Ni plating layer)

Evaluation of Fiber Layer (1) It is apparent from the micrographs shown in FIGS. 4 (FIGS. 4A, 4B and 4C are collectively referred to as "FIG. 4") to 8 that there are a variety of carbon fiber raised states (fiber layer forms), depending on differences in the composition of the test pieces and the presence or absence of a nickel plating layer. Specifically, as is apparent from FIG. 4A, raised carbon fibers form directly on the surface of alloyed steel (SKD61) commonly used in molds. Of course, as is apparent from FIGS. 4B and 4C, raised carbon fibers also form on a nickel plating layer provided on the surface of such alloyed steel.

The following is apparent from a comparison of FIGS. 4A, 4B and 4C. As can be seen from FIG. 4A, carbon fibers that were raised directly on a test piece made of SKD61 have a small fiber diameter. Moreover, those fine carbon fibers are very densely raised, forming a fiber layer having a relatively high raised fiber density. Conversely, as shown in FIGS. 4B and 4C, carbon fibers that were raised on a nickel plating layer have a relatively large fiber diameter. Also, these carbon fibers are relatively sparsely raised, forming a resilient fiber layer having a relatively small raised fiber density. Moreover, the fiber diameter and maximum spatial dimension for these carbon fibers differed according to the thickness of the nickel plating layer. Because it is difficult to directly specify the raised fiber density of the fiber layer, the form of the fiber layer was instead evaluated here using the maximum spatial dimensions, which is the distance between the carbon fibers.

From the above, it is possible to form the desired fiber layer at a high degree of freedom by controlling whether or not a nickel plating layer is present and the thickness of the nickel plating layer. In other words, by suitably adjusting the presence or absence of the underlayer (nickel plating layer) and its thickness according to the region of the mold surface where a solidified body is to be formed, there can be obtained a mold having a contact surface well-suited for filling and solidification of the molten material.

Figure 7A:
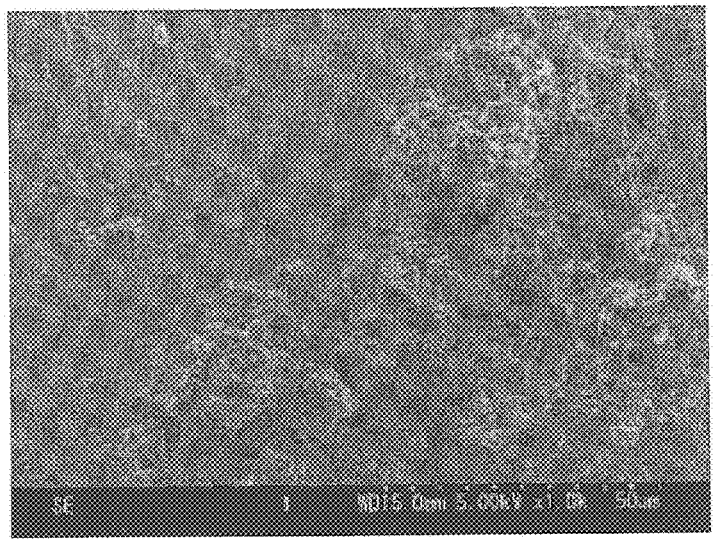
FIG. 7A is a scanning electron micrograph showing the surface of a test piece following surface treatment, this being the surface of test piece No. 3-1 (Cu–2.1% Ni)
Figure 7B:
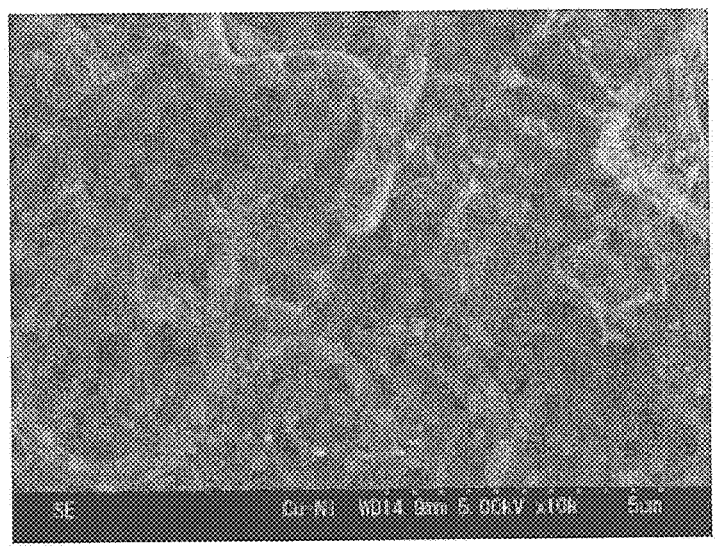
FIG. 7B is a scanning electron micrograph showing the surface of a test piece following surface treatment, this being the surface of test piece No. 3-2 (Cu–6.6% Ni)
Figure 8A:
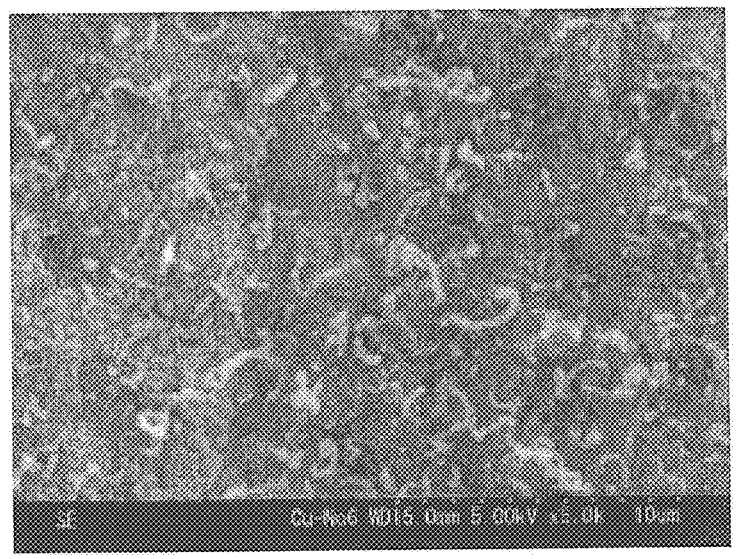
FIG. 8A is a scanning electron micrograph showing the surface of a test piece following surface treatment, this being the surface of test piece No. 4-1 (Cu–1.4% Fe)
Figure 8B:
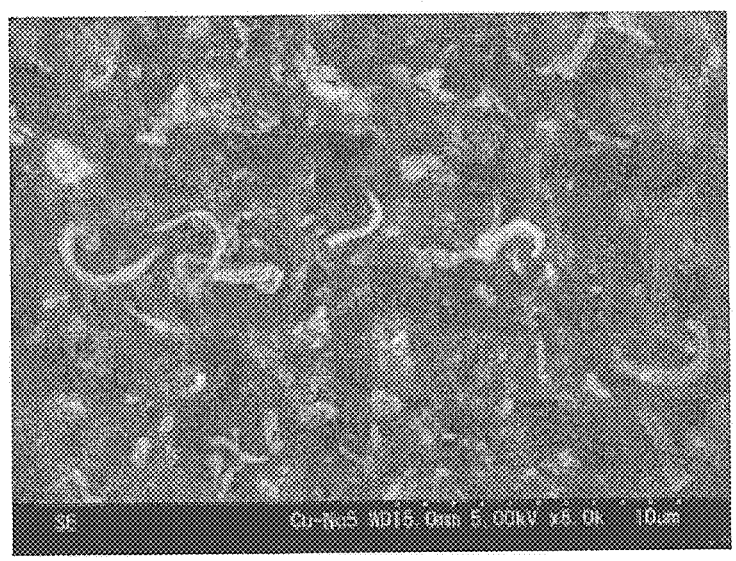
FIG. 8B is a scanning electron micrograph showing the surface of a test piece following surface treatment, this being the surface of test piece No. 4-2 (Cu–6.4% Fe)

(2) The micrographs shown in FIGS. 5 (FIGS. 5A and 5B are collectively referred to as "FIG. 5") to 8 are of test pieces made of a copper alloy. In cases where surface treatment was carried out directly on the test piece without underlying treatment, first of all it is apparent from FIG. 6A that raised carbon fibers do not form on a Cu–62% W test piece (here and below, the units are in percent by weight). From this standpoint, it is apparent that copper and tungsten are elements which do not allow the formation of raised carbon fibers thereon. On the other hand, as shown in FIGS. 7 (FIGS. 7A and 7B are collectively referred to as "FIG. 7") and 8 (FIGS. 8A and 8B are collectively referred to as "FIG. 8"), in the case of test pieces composed of copper alloys which contain a specific element (nickel or iron) having a catalytic effect that promotes the formation of raised carbon fibers, it is apparent that the carbon fiber raising state varies according to the content of the specific element. That is, when the specific element is not included, the formation of raised carbon fibers does not occur; when there is too little of the specific element, the formation of raised carbon fibers remains limited; and when the level of the specific element exceeds a given amount, sufficient formation of raised carbon fibers occurs. This is apparent from the percent coverage shown in Table 1. However, as shown in FIGS. 7 and 8, it is not easy to control the carbon fiber raising state merely by the ingredient composition of the test piece.

As shown in FIGS. 5A, 5B, 6A and 6B, by providing a nickel plating layer and controlling the thickness thereof, it is possible to form the desired fiber layer even on various test pieces. Thus, by suitably adjusting the presence or absence of nickel plating layer formation and the thickness of the nickel plating layer according to the region of the inside surface of the mold, it is possible to easily manufacture a mold having a plurality of contact surface portions with differing surface states.

Casting Test

Figure 2:
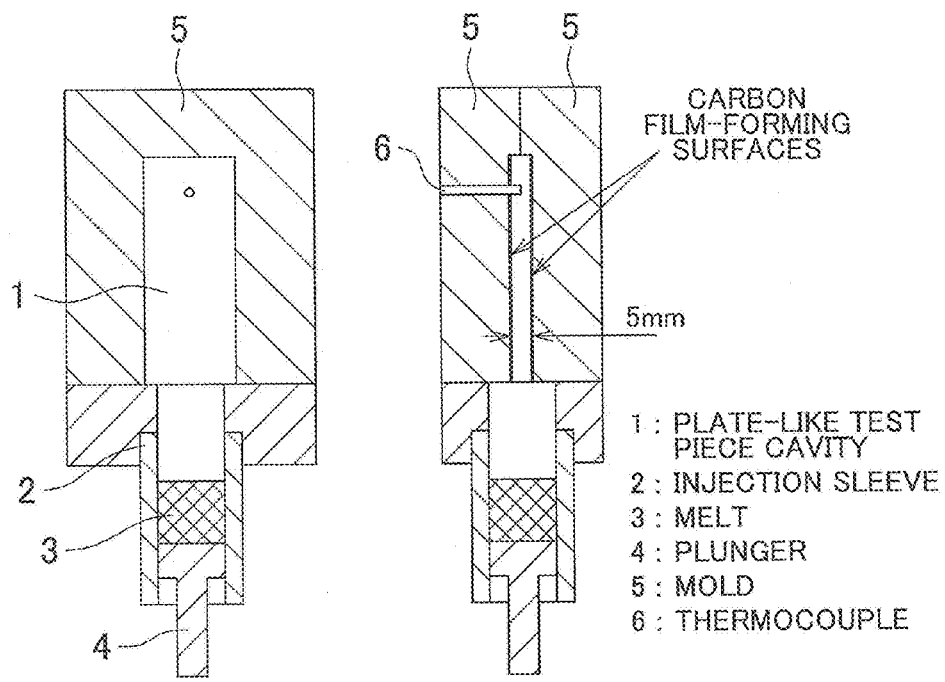
FIG. 2 presents a front view and a side view which schematically show cross-sections of a pressurized casting apparatus used for fabricating test pieces.

Plate-like test pieces (80 mm (width)×120 mm (length)×5 mm (thickness)) were die cast using molds subjected to various surface treatments. The pressurized casting apparatus (die casting apparatus) used at that time is shown schematically in FIG. 2. Four types of molds (K1 to K4) of differing materials and surface treatments on the inner walls of the cavity were furnished as the mold 5 of this casting apparatus. The specific details for each are shown in Table 2. Moreover, surface treatment of the mold (K2 and K4) was carried out according to the above-described method and conditions. The inner surfaces of the molds that were not subjected to surface treatment (K1 and K3) was pre-coated with a water-soluble mold release material prior to filling the mold with the melt.

An aluminum alloy (JIS ADC12) was used as the melt. The melt temperature at the start of filling by means of a plunger was set to 650° C. The melt was filled into the mold at a low rate for about 2 seconds (filling step). After the end of filling and up to the end of solidification, a casting pressure of about 50 MPa was applied to the melt. The mold was opened 5 seconds after the start of filling. In this way, a plate-like die casting (solidified body) of the melt (molten material) was obtained (cooling step).

Figure 3:
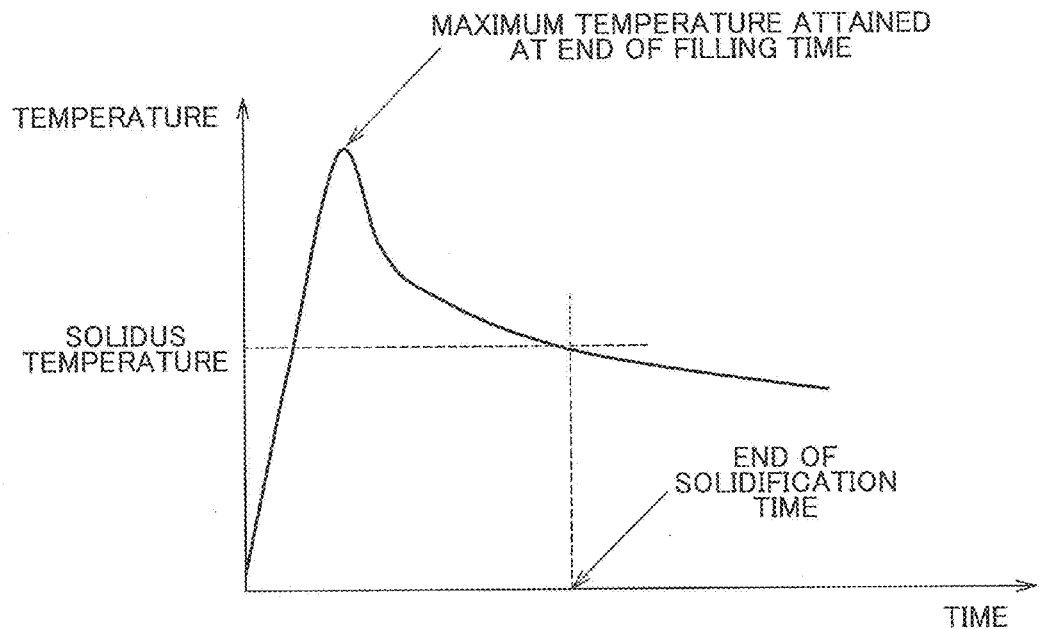
FIG. 3 is a graph schematically showing the change over time in the temperature of a metal melt filled into a mold.

Changes in the temperature of the melt (see FIG. 3) during die casting were measured with thermocouples placed 60 mm below the top end of the cavity. Next, the maximum temperature attained at the end of filling time was obtained; in addition, the end of solidification time was obtained. The end of solidification time was the time from the start of filling until the time that the melt temperature reached the solidus temperature of the aluminum alloy. Table 2 shows the maximum temperature attained and the end of solidification time when die casting was carried out using each mold.

Evaluation of Castability (1) The following is apparent from the maximum temperatures attained at the end of filling time and from the end of solidification times shown in Table 2. First, when a mold K1 (made of SKD61) in which the contact surface that comes into contact with the melt had not been surface treated was used, the end of solidification time was short and solidification rapidly ended. However, the maximum temperature attained by the melt at the end of filling time was about 10° C. lower than the temperature at the start of filling. For this reason, when mold K1 is used, an increase in the casting efficiency due to shortening of the task time is achieved, but improving the spreadability and mold filling ability of the melt is difficult.

On the other hand, when a mold K2 (made of SKD61+a fiber layer) that had a contact surface which was similar to that of mold K1 but had been surface treated and did not have an underlayer thereon was used, although the maximum temperature attained was high, the end of filling time was long. For this reason, although improvements in the spreadability and molding filling ability of the melt are achieved, it is difficult to improve the casting efficiency by shortening the task time.

When a mold K3 (made of pure copper) in which surface treatment had not been applied to the contact surface which comes into contact with the melt was used, the maximum temperature attained at the end of filling time was lower and the end of solidification time was shorter than when mold K1 was used. The reason is that mold K3 had a better thermal conductivity than mold K1. However, in this case, the amount of heat lost by the mold from the start of mold filling is large, as a result of which the spreadability and mold filling ability of the melt may decrease.

When a mold K4 (made of SKD61+nickel plating layer+fiber layer) which had an underlayer (nickel plating layer) on the contact surface of mold K3 and had been surface treated was used, the maximum temperature attained at the end of filling time was relatively high and the end of solidification time was relatively short. The reason appears to be that mold K4 does not cool the melt much during filling, and rapidly cools the pressurized melt following the end of filling.

Here, on comparing the properties of mold K2 mold with mold K4, both have in common the point that the maximum temperature attained at the end of filling time was high (the temperature decrease during filling of the melt was small). The reason appears to be that the surface treatment layer (in particular, the fiber layer) of the mold manifests a heat-insulating effect during filling of the melt. However, there is a large disparity between the two molds in their end of solidification times. The reason why such a disparity arises is thought to be that, in addition to the large difference in the thermal conductivities of the molds, the properties of the fiber layers also differ considerably. Specifically, this appears to be on account of the fact that the fiber layer in mold K2 is, as shown in FIG. 4A, a dense fiber layer, whereas the fiber layer in mold K4 is, as shown in FIG. 5A, a sparse fiber layer. Because this sparse fiber layer has a high resilience and the thickness, raised fiber density and other properties of the fiber layer thus vary with changes in the melt pressure, during filling of the melt, the fiber layer functions as an excellent heat-insulating layer, whereas after the end of filling, heat is readily transferred from the pressurized melt to the mold.

(2) By suitably combining, based on the above findings, the selection of the mold base material, whether or not to apply surface treatment to the inside surfaces thereof, and the form of the fiber layer that is created, it is possible to control heat transfer between the melt and the mold, not only from place to place (or spatially), but also over time. In this way, it is possible to achieve rapid cooling and solidification of the melt after the end of filling time and to shorten the end of solidification time (task time), even while minimizing the decrease in the temperature of the melt during mold filling.

To be specific, when an entire mold is made of the same material, it is desirable to provide a fiber layer that exhibits heat-insulating properties in portions of the mold where one wishes to suppress a decline in the temperature of the melt during filling, such as the inlet portion of the melt flow channel (e.g., the gate). On the other hand, in portions of the mold where a decline in the temperature of the melt is not a concern, such as at the end of the melt flow channel and in areas that require a fine, dense metal structure, it not always essential to provide a fiber layer. Moreover, even in cases where a fiber layer is provided over the entire surface, an optimal fiber layer may be provided for each region of the contacting surface portion by choosing whether or not an underlayer is present and adjusting the form of the fiber layer. For example, a dense fiber layer may be provided at the inlet portion of the melt flow channel, and a sparse fiber layer may be provided at the end of the melt flow channel.

In addition, when a base having a high thermal conductivity (e.g., a core or insert made of a copper alloy) is used as a part of a mold in order to form a fine, dense metal structure in certain areas, it is even more preferable to form a sparse fiber layer on that base.

Next, a mold of the example and a mold of the comparative example are prepared and solidified bodies are cast using these molds. The mold of the example is obtained by forming an underlayer (nickel plating layer) on the base (copper alloy) and forming a fiber layer (carbon nanofiber layer) on the underlayer. The mold of the comparative example is obtained by applying a commonly used mold wash to the base (copper alloy). The results of examination showing a surface condition of the mold of the example and a surface condition of the mold of the comparative example after the solidified bodies are cast and the results of examination showing the quality of the solidified bodies according to the example and the solidified bodies according to the comparative example that are cast using the mold of the example and the mold of the comparative example, respectively, are shown below.

Figure 9A:
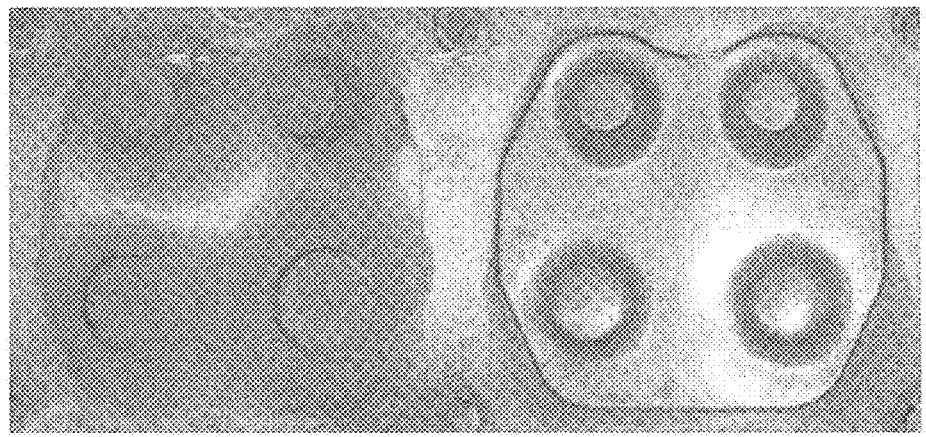
FIG. 9A is a diagram showing a surface condition of a mold of an example of the invention and a surface condition of a mold of a comparative example before a solidified body is cast.
Figure 9B:
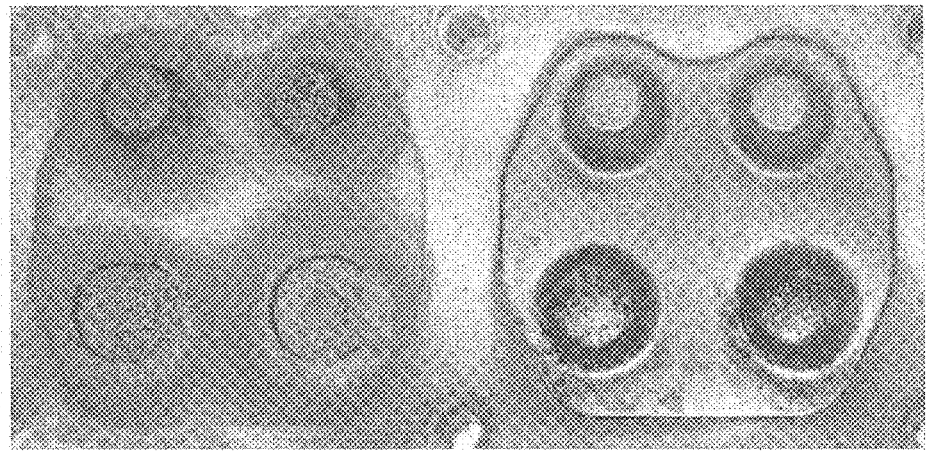
FIG. 9B is a diagram showing a surface condition of the mold of the example of the invention and a surface condition of the mold of the comparative example after the solidified body is cast.

In FIGS. 9A and 9B, the mold of the example is shown in the right side and the mold of the comparative example is shown in the left side. FIG. 9B shows a surface condition of the molds after casting is performed six times. It can be seen in FIG. 9B that there is a deposit on the mold of the comparative example and there is almost no deposit on the mold of the example.

In FIG. 10, the solidified body according to the example is shown in the right side and the solidified body according to the comparative example is shown in the left side. In FIG. 10, the surface of the solidified body according to the example is glossy and the surface of the solidified body according to the comparative example is less glossy than in the case of the example of the invention. This indicates that the inside of the solidified body according to the example is high in quality.

Figure 11:
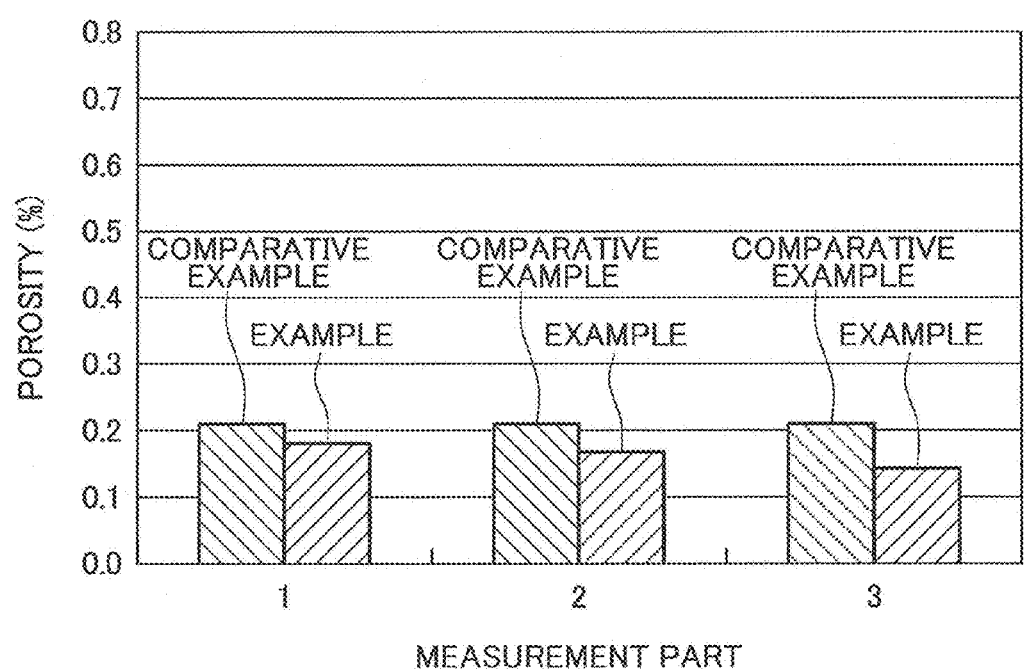
FIG. 11 is a diagram showing results of measurement of porosities of the solidified body according to the example of the invention and the solidified body according to the comparative example.

As the evaluation of the quality of the solidified body according to the example and the solidified body according to the comparative example, the porosities of these solidified bodies are measured at three parts in each solidified body. The results are shown in FIG. 11 and Table 3. In FIG. 11 and Table 3, the solidified body according to the example has porosities equal to or less than 0.18% and the solidified body according to the comparative example is greater in porosity than the solidified body according to the example. This indicates that the solidified body according to the example is improved in strength.

TABLE 1

| Test piece No. | Base (wt %) | Underlayer (Ni plating layer) thickness (μm) | Fiber layer Fiber diameter (μm) | Fiber layer Maximum spatial dimension (μm) | Coverage (%) |
|---|---|---|---|---|---|
| 1-1 | SKD61 | 0 (none) | ≤0.1 | ≤1 | 100 |
| 1-2 | SKD61 | 0.4 | 0.1 to 0.2 | ≥10 | 100 |
| 1-3 | SKD61 | 2.9 | 0.1 to 0.2 | <10 | 100 |
| 2-1 | Cu—62% W | 0 (none) | — | — | 0 |
| 2-2 | Cu—62% W | 0.37 | 0.1 to 0.5 | ≥10 | 100 |
| 2-3 | Cu—62% W | 0.51 | 0.1 to 0.5 | ≥10 | 100 |
| 2-4 | Cu—62% W | 0.56 | 0.1 to 0.5 | ≥10 | 100 |
| 2-5 | Cu—62% W | 1.83 | 0.1 to 0.3 | <10 | 100 |
| 2-6 | Cu—62% W | 7.3 | 0.1 to 0.2 | <10 | 100 |
| 3-1 | Cu—2.1% Ni | none | 0.1 to 1.2 | — | 25 |
| 3-2 | Cu—6.6% Ni | | 0.2 to 1.2 | ≥10 | 100 |
| 4-1 | Cu—1.4% Fe | | 0.2 to 0.4 | — | 30 |
| 4-2 | Cu—6.4% Fe | | ≤0.05 to 0.4 | <10 | 100 |

SKD61 (JIS):
C: 0.32 to 0.42; Si: 0.8 to 1.2; Cr: 4.5 to 5.5; Mo: 1 to 1.5; V: 0.8 to 1.2; Fe: balance

TABLE 2

| Mold No. | Base | Surface treatment Underlayer (thickness, μm) | Surface treatment Fiber layer (μm) | Maximum temperature attained at end of filling time (° C.) | End of solidification time (seconds) |
|---|---|---|---|---|---|
| K1 | SKD61 | | none | 640 | 6 |
| K2 | SKD61 | — | Fiber diameter: ≤0.05 Maximum spatial dimension: 0.05 to 0.2 | 644 | 11 |
| K3 | Cu | | none | 635 | 5 |
| K4 | Cu | Ni plating layer (0.5 μm) | Fiber diameter: 0.1 to 0.5 Maximum spatial dimension: 15 to 30 | 645 | 8 |

TABLE 3

| Measurement part No. | Porosity of solidified body according to comparative example(%) | Porosity of solidified body according to example(%) |
|---|---|---|
| 1 | 0.22 | 0.18 |
| 2 | 0.21 | 0.17 |
| 3 | 0.21 | 0.14 |

What is claimed is:

1. A mold comprising:
a base made of metal; and
a contact surface which is provided on the base such that the contact surface comes into contact with a molten material,
wherein the contact surface includes a first surface portion having a first underlayer that serves as a foundation of first carbon fibers that are raised directly on the base, and a second surface portion having a second underlayer that serves as a foundation of second carbon fibers that are raised directly on the base, and
wherein the first underlayer and the second underlayer being of different thicknesses such that the first surface portion differs from the second surface portion in at least one of average fiber diameter, average fiber length, and raised fiber density.

2. The mold according to claim 1, wherein the first carbon fibers are made of at least one of carbon nanofibers, carbon nanocoils and carbon nanotubes.

3. The mold according to claim 1, wherein the first underlayer contains one or more specific elements selected from the group consisting of nickel, iron and cobalt.

4. The mold according to claim 1, wherein the base which is provided with the first underlayer is formed of a metal having no raised first carbon fibers thereon.

5. The mold according to claim 4, wherein the metal is copper or a copper alloy.

6. The mold according to claim 1, which is a die casting mold into a cavity of which a metal melt which is the molten material is filled under pressure.

* * * * *